United States Patent [19]
Shiffler

[11] Patent Number: 5,458,149
[45] Date of Patent: Oct. 17, 1995

[54] MULTI-STAGE FLUID FLOW CONTROL DEVICE

[75] Inventor: Mark E. Shiffler, Annapolis, Md.

[73] Assignee: The United States of America as represented by the Secretary of the Navy, Washington, D.C.

[21] Appl. No.: 268,991

[22] Filed: Jun. 30, 1994

[51] Int. Cl.⁶ .................................................. F16L 55/10
[52] U.S. Cl. ........................................ 137/614.11; 138/89
[58] Field of Search ........................... 137/614.11; 138/89

[56] References Cited

U.S. PATENT DOCUMENTS

| | | | |
|---|---|---|---|
| 1,966,819 | 7/1934 | Irvin | 138/89 |
| 1,993,307 | 3/1935 | Nicholson | 138/89 |
| 4,506,706 | 3/1985 | Sandmann . | |
| 4,625,765 | 12/1986 | O'Donnell . | |
| 4,723,578 | 2/1988 | Modarski . | |
| 4,886,939 | 12/1989 | Kinnan . | |
| 4,982,764 | 1/1991 | Saxon . | |
| 5,224,516 | 7/1993 | McGovern et al. | 138/89 |

*Primary Examiner*—A. Michael Chambers
*Attorney, Agent, or Firm*—Charles D. Miller

[57] ABSTRACT

A fluid flow control device is defined by a plurality of flow control stages mounted on a rod. Each of the flow control stages includes a support brace providing sliding support of the rod, an end plate fixably mounted on the rod, and an elastomeric element mounted on the rod between the support brace and the end plate. The elastomeric element defines an annular cavity around an inside perimeter of the tube. The elastomeric element expands between the end plate and support brace in accordance with axial movement of the rod in order to adjust the size of the annular cavity.

17 Claims, 4 Drawing Sheets

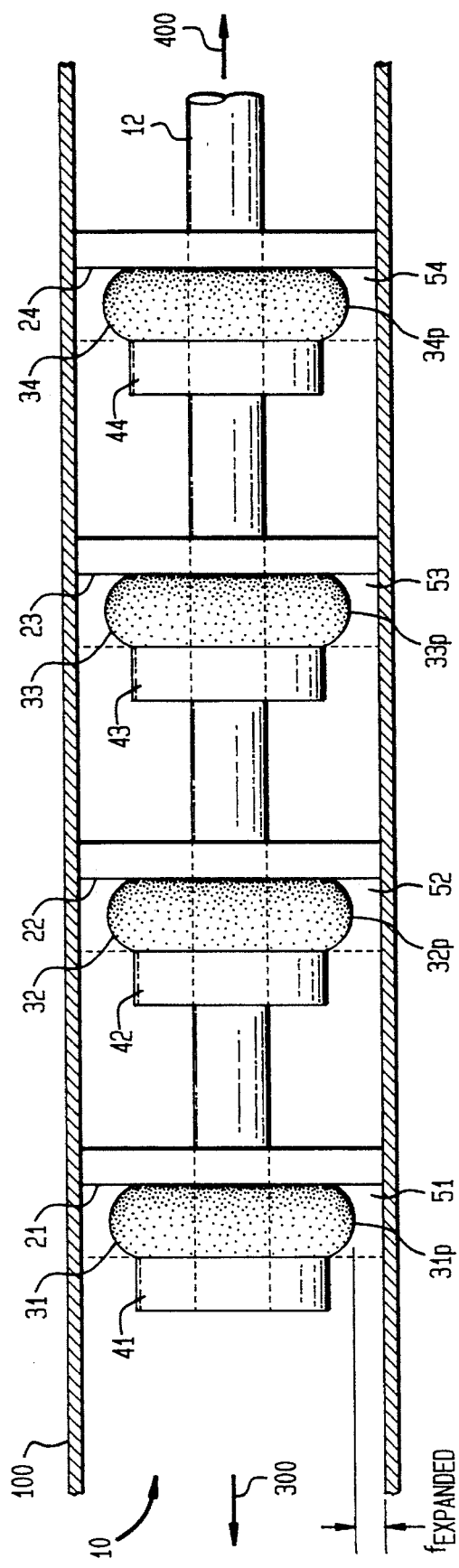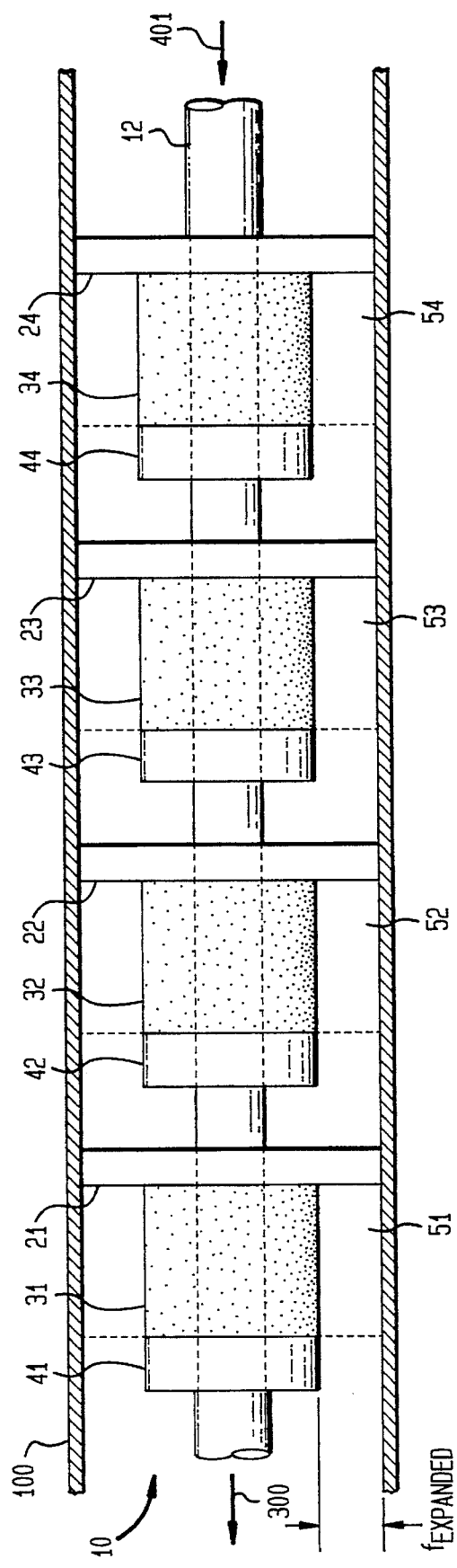

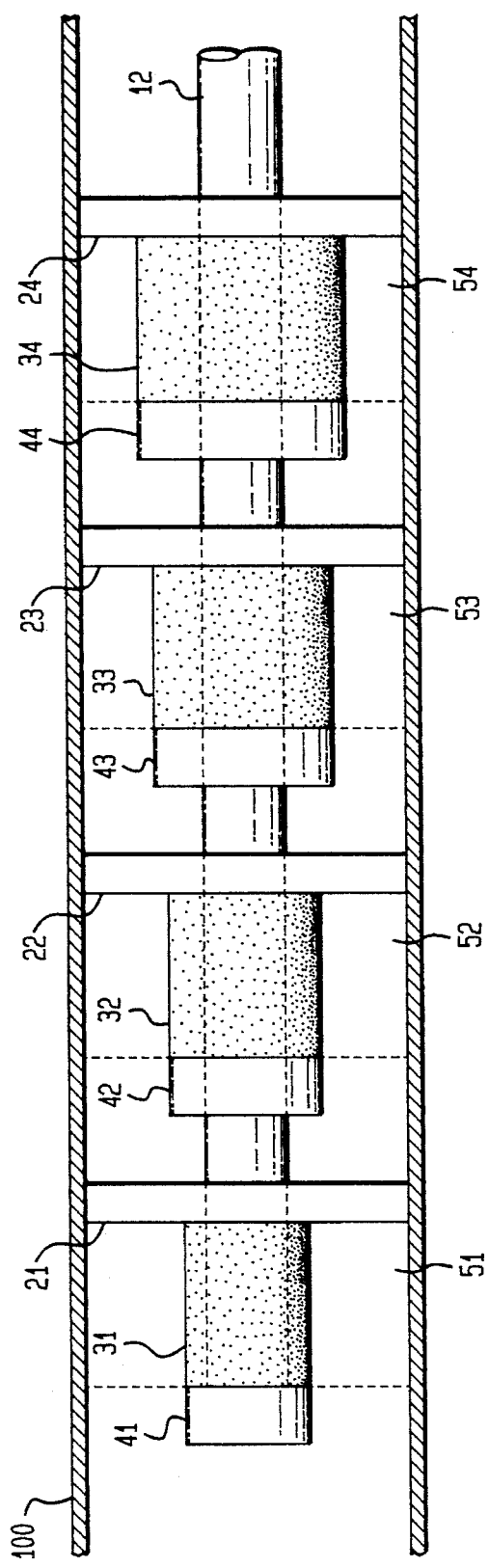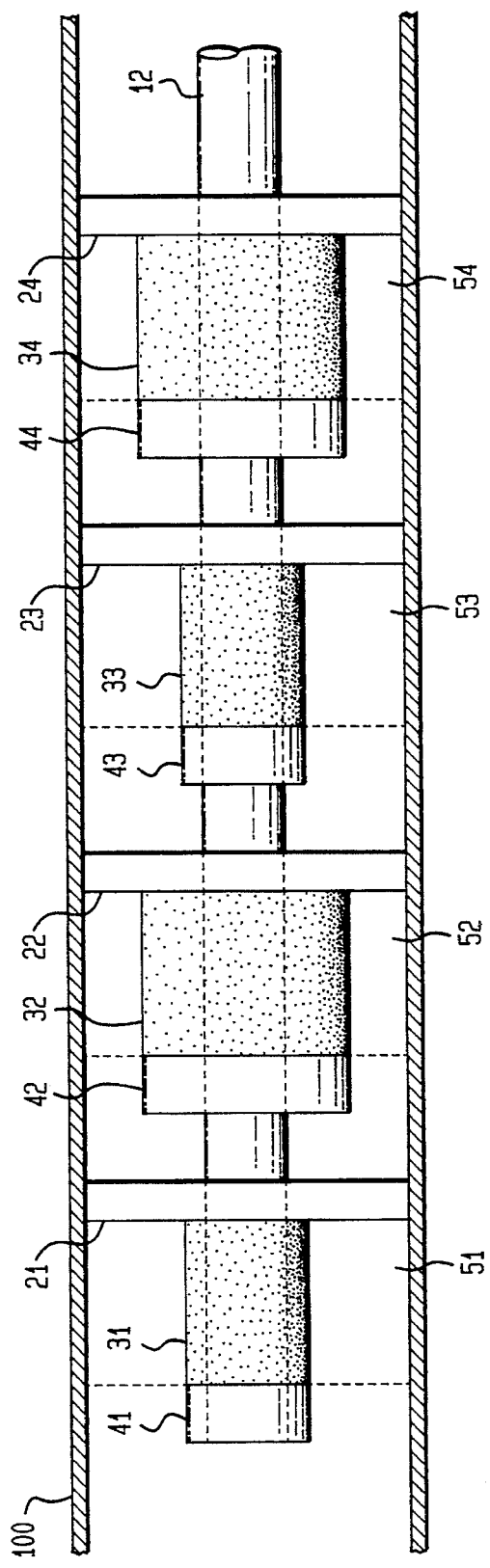

MULTI-STAGE FLUID FLOW CONTROL DEVICE

The invention described herein may be manufactured and used by or for the Government of the United States of America for governmental purposes without payment of any royalties thereon or therefor.

FIELD OF THE INVENTION

The invention relates generally to fluid flow control and valve mechanics, and more particularly to a fluid flow control device that reduces cavitation and associated noise while controlling fluid flow.

BACKGROUND OF THE INVENTION

Most fluid flow control valves consist of a machined seat cooperating with a movable element in the form plug, needle, globe, ball or other geometrical shape. When the movable element is in contact with the seat, fluid flow is inhibited. When the movable element is moved away from the seat, a fluid flow area is formed. Where quiet flow control is required, the flow area includes additional flow control elements. These elements typically incorporate multiple orifices or small flow control passages in order to gradually reduce the pressure of the fluid flow such that flow separation and cavitation can be reduced or avoided. However, fluid contaminants often clog the orifices or passages necessitating costly repair.

SUMMARY OF THE INVENTION

Accordingly, it is an object of the present invention to provide a fluid flow control device that reduces cavitation and noise.

Another object of the present invention is to provide a fluid flow control device that is simple to manufacture and service.

Still another object of the present invention is to provide a fluid flow control device that is not subject to clogging by most fluid contaminants.

Other objects and advantages of the present invention will become more obvious hereinafter in the specification and drawings.

In accordance with the present invention, a fluid flow control device is provided. The device includes a plurality of flow control stages mounted on a rod. Each of the flow control stages includes a support brace fixably mounted in the tube for providing sliding support of the rod along a longitudinal axis of the tube, an end plate fixably mounted on the rod, and an elastomeric element mounted on the rod between the support brace and the end plate. The elastomeric element is in sliding engagement with the rod and defines an annular cavity around an inside perimeter of the tube. The end plate causes the elastomeric element to expand to adjust the size of the annular cavity in accordance with axial movement of the rod.

BRIEF DESCRIPTION OF THE DRAWINGS

FIG. 3 is a side elevational view of the multi-stage fluid flow control device in which the elastomeric elements have been expanded radially to decrease the fluid free-flow area between the fluid flow control device and the fluid flow tube;

FIG. 4 is a side elevational view of the multi-stage fluid flow control device in which the elastomeric elements have been expanded axially to increase the fluid free-flow area between the fluid flow control device and the fluid flow tube;

FIG. 5A is an alternative embodiment fluid flow device configured to provide a varying free-flow area within the fluid flow tube;

FIG. 5B is another alternative embodiment fluid flow device configured with elastomeric elements sized to provide a varying size fluid free-flow area.

DETAILED DESCRIPTION OF THE INVENTION

Figure 1:
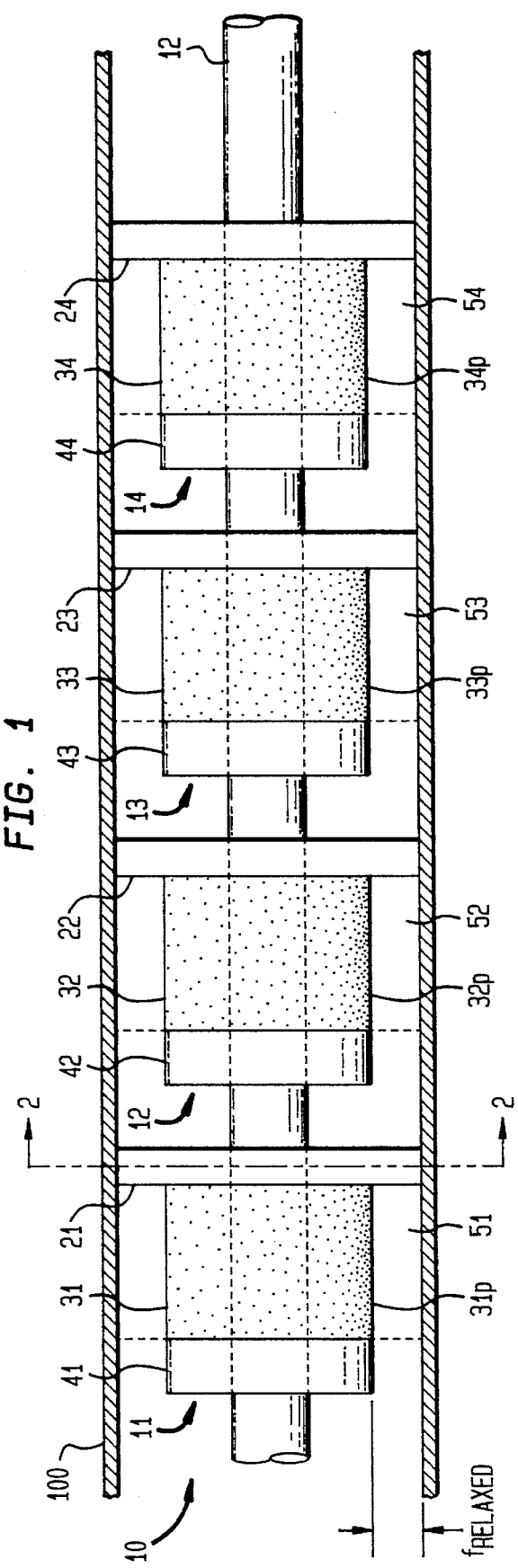
FIG. 1 is a side elevational view of a preferred embodiment multi-stage fluid flow control device in its relaxed state in a fluid flow tube.

Referring now to the drawings, and more particularly to FIG. 1, a side elevational view is shown of a preferred embodiment flow control device, referenced generally by the numeral 10. Device 10 is installed in fluid flow constraining tube 100 which is shown in cross-section. Device 10 is shown in FIG. 1 is in its relaxed or fully open state.

Device 10 is divided into flow control stages 11–14 and is formed by corresponding pluralities of supports 21–24, elastomeric elements 31–34 and end plates 41–44. While four flow control stages are shown in the embodiment of FIG. 1, more or less stages can be used as needed. Rod 12 is supported in a central portion of tube 100 by supports 21–24 and is terminated at end plate 41. Rod 12 can be made from any suitable inelastic material. If device 10 is to operate in a water environment, rod 12 is typically made from a non-corrosive material such as graphite, fiberglass, stainless steel, etc. Each of end plates 41–44 can be integral with rod 12, or fixedly attached to rod 12 by a variety of conventional attachment means, e.g., welded, peened, pinned, etc. As will become more apparent below, the diameter of each end plate 41–44 is selected to be large enough to affect the expansion of elastomeric elements 31–34 but small enough to be invisible to the fluid flow through tube 100. Once again, if device 10 is to operate in a water environment, materials used for end plates 41–44 can be non-corrosive materials such as graphite, fiberglass, stainless steel, etc.

Figure 2:
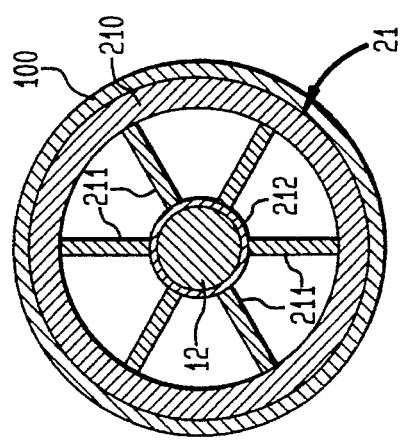
FIG. 2 is a cross-sectional view of one of the supports taken along line 2—2 of FIG. 1.

Each support 21–24 can be any one of a variety of designs that: 1) permits fluid to flow therethrough, 2) supports rod 12 in a central portion of tube 100, and 3) permits axial movement of rod 12. By way of example one such support is of "wagon-wheel" construction as shown in FIG. 2 which depicts a cross-sectional view of support 21 taken along line 2—2 of FIG. 1. The outer circumferential portion 210 of support 21 is attached by any one of a variety of conventional means (e.g., welded, brazed, fused, epoxied, etc.) to the inside of tube 100. A plurality of radially extending supports 211 connect outer circumferential portion 32 with bearing support 212. Rod 12 passes through bearing support 212 and is capable of axial movement therein. Supports 22–24 are constructed in a similar fashion. Materials used to construct supports 21–24 can be selected based on strength, reactiveness to the particular fluid, etc. If the fluid is water, supports 21–24 are typically constructed from a non-corrosive material such as graphite, fiberglass, stainless steel, etc.

Each elastomeric element 31–34 is free to slide on rod 12 and is sandwiched between a corresponding one of supports 21–24 and a corresponding one of end plates 41–44. Elastomeric elements 31–34 can be made from any one of a variety of elastomers such as rubber, polyurethane and silicon. The shape of each elastomeric element 31–34 is typically cylindrical. The diameter and thickness of each elastomeric element 31–34 can be the same (as shown in FIG. 1) or different as will be described further below. Depending on how device 10 will be used, elastomeric elements 31–34 can also be affixed to their corresponding support and end plate.

Regardless of their individual construction, in their relaxed state, elastomeric elements 31–34 define corresponding annular cavities 51–54 between their outer perimeters 31p–34p and tube 100. The circumferential area between perimeters 31p–34p and tube 100 is defined as the free-flow area $f_{relaxed}$ when device 10 is in its relaxed state shown in FIG. 1.

In operation, fluid flows through tube 100 in a direction as represented by arrow 300. When it is desired to control or limit fluid flow 300, rod 12 is moved axially in the direction of arrow 400 as shown in FIG. 3. As a result, end plates 41–44 move in the direction of arrow 400 causing compressive forces (from end plates 41–44 and supports 21–24) to act upon elastomeric elements 31–34. As elastomeric elements 31–34 compress, each elastomeric element's perimeter 31p–34p expands radially thereby reducing the size of annular cavities 51–54, i.e., reducing fluid free-flow area between device 10 and tube 100 to $f_{expanded}$ where $f_{expanded} < f_{relaxed}$. Since the fluid free-flow area is reduced in stages defined by the elastomeric elements in flow control stages 11–14, pressure drop across device 10 is achieved in stages. By doing this, the creation and collapse of vapor pockets in the fluid flow (i.e., cavitation) around device 10 is prevented. When rod 12 is moved in the direction opposite that of arrow 400, elastomeric elements 31–34 spring back toward their relaxed size/shape (FIG. 1).

As mentioned above, elastomeric elements 31–34 can be affixed or bonded to their corresponding supports 21–24 and end plates 41–44. In this way, device 10 can be operated to both decrease the size of annular cavities 51–54 (as shown and described above with respect to FIG. 3), and increase the size of annular cavities 51–54 as will now be described with the aid of FIG. 4. In FIG. 4, elastomeric elements 31–34 are affixed or bonded to their corresponding supports 21–24 and end plates 41–44. Axial movement of rod 12 is in the direction of arrow 401 thereby causing axial expansion of elastomeric elements 31–34. The axial expansion increases the size of annular cavities 51–54 and therefore increases the free-flow area such that $f_{expanded} > f_{relaxed}$. Once again, when rod 12 is moved in the direction opposite that of arrow 401, elastomeric elements 31–34 spring back toward their relaxed size/shape. Note that the diameter of the ends of elastomeric elements 21–24 and the diameter of end plates 41–44 are sized to accommodate the axial expansion shown in FIG. 4.

Figure 5C:
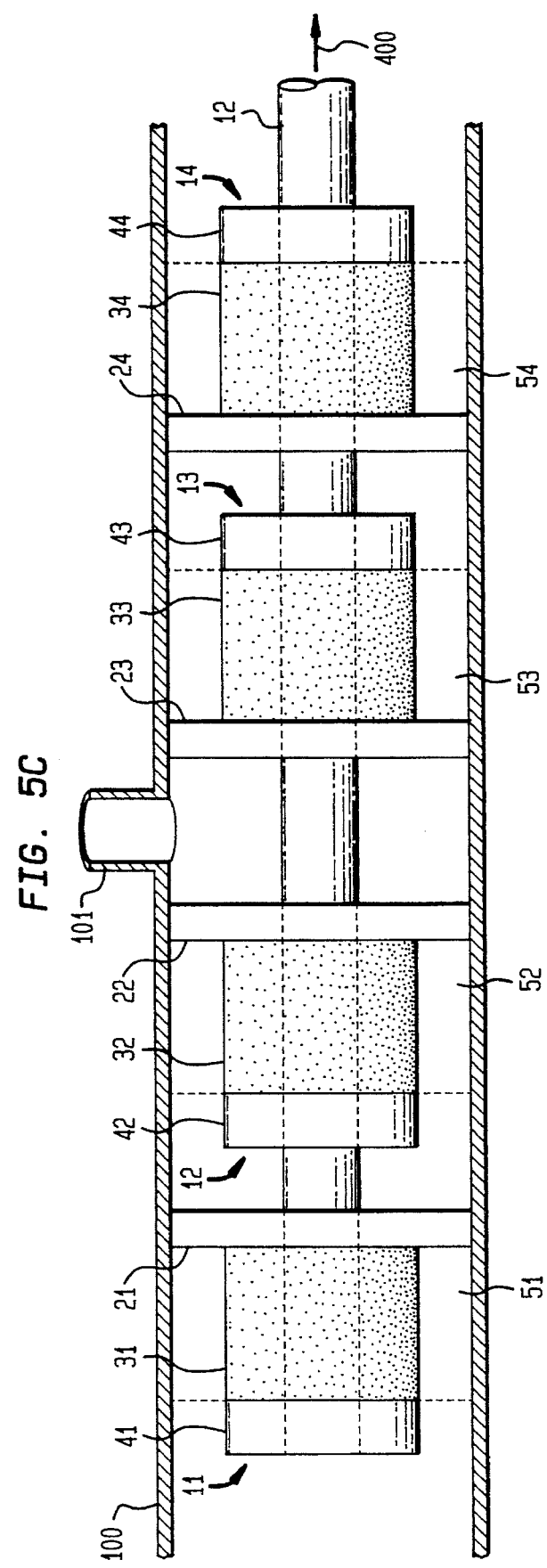
FIG. 5C is yet another alternative embodiment fluid flow device configured as either a mixing or directional valve.

Alternative embodiments are shown in FIGS. 5A–5C where various sizes and configurations of flow control stages 11–14 are shown as they would be arranged on rod 12. Flow control stage configurations in the present invention can vary depending on a variety of factors which can include fluid viscosity, response time required of the device, amount of room available for the stroke of the actuator rod, whether the fluid is a liquid or a gas, etc.

In FIG. 5A, elastomeric elements 31–34 are sized in their relaxed state to form a changing free-flow area as annular cavities 51–54 steadily decrease in size. Naturally, the size and shape of the free-flow area can be reversed. In the embodiment of FIG. 5B, elastomeric elements increase and decrease in size radially in an alternating fashion. In FIG. 5C, flow control stages 11–14 are arranged about port 101 in tube 100. More specifically, stages 11 and 12 are located on one side of port 101 and are arranged so that axial movement in the direction of arrow 400 causes elastomeric elements 31 and 32 to expand radially to decrease (or eliminate) the size of annular cavities 51 and 52. Stages 13 and 14 are located on the other side of port 101 and are arranged so that the same axial movement of rod 12 in the direction of arrow 400 causes elastomeric elements 33 and 34 to expand axially to increase the size of annular cavities 53 and 54 as annular cavities 51 and 52 are decreasing. The opposite situation would result if rod 12 were moved in direction opposite that of arrow 400. In this way, the present invention can be used as a mixing valve if two different fluids are to be mixed for output via port 101. Further, the structure of FIG. 5C allows the present invention to function as a directional valve if the fluid flow were to be input via port 101. Obviously, other combinations and sizes of elastomeric elements can be used depending on the type of desired flow control.

The advantages of the present invention are numerous. The flow control device is a simple multi-stage device that can be manufactured and maintained at a minimal cost. Customized quiet flow control can be achieved merely by proper selection and arrangement of cylindrical elastomeric elements.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed is:

1. A device mounted in a tube for controlling fluid flow through said tube, comprising:

a rod:

a plurality of flow control stages mounted on said rod, each of said plurality of flow control stages including a support brace rigidly and permanently attached to an inner surface of said tube for providing sliding support of said rod along a longitudinal axis of said tube, an end plate fixably mounted on said rod, and an elastomeric element mounted on said rod between said support brace and said end plate;

said elastomeric element in sliding engagement with said rod;

said elastomeric element defining an annular cavity around an inside perimeter of said tube; and said end plate causing said elastomeric element to expand to adjust the size of said annular cavity with axial movement of said rod.

2. A device as in claim 1 wherein, for each of said plurality of flow control stages, said support brace, said elastomeric element and said end plate are arranged such that the size of said annular cavity is reduced when said axial movement of said rod causes said end plate to expand said elastomeric element transverse to said axial movement.

3. A device as in claim 1 wherein said elastomeric element is fixed to said support brace and said end plate, and wherein, for each of said plurality of flow control stages, said support brace, said elastomeric element and said end plate are arranged such that the size of said annular cavity increases when said axial movement of said rod causes said end plate to expand said elastomeric element parallel to said axial movement.

4. A device as in claim 1 wherein said elastomeric element is cylindrical.

5. A device as in claim 1 wherein the fluid flowing through said tube is water, and wherein said rod, said support brace and said end plate are made from materials that are non-corrosive with respect to water.

6. A device as in claim 1 wherein, for each of said plurality of flow control stages, said elastomeric element is sized to define said annular cavity of similar size.

7. A device as in claim 1 wherein said plurality of flow control stages are arranged on either side of a port in said tube, a portion of said plurality of flow control stages arranged such that said axial movement of said rod expands each said elastomeric element associated with said portion transverse to said axial movement, and a remainder of said plurality of flow control stages arranged such that said axial movement of said rod expands each said elastomeric element associated with said remainder parallel to said axial movement.

8. A device mounted in a tube for controlling fluid flow through said tube, comprising:

a rod;

a plurality of support braces each rigidly and permanently attached to an inner surface of said tube for providing sliding support of said rod along a longitudinal axis of said tube;

a plurality of end plates fixably mounted on said rod;

a plurality of elastomeric elements mounted on said rod and interleaved between said plurality of support braces and said plurality of end plates;

each of said plurality of elastomeric elements in sliding engagement with said rod;

said plurality of elastomeric elements defining a corresponding plurality of annular cavities around an inside perimeter of said tube; and said plurality of end plates causing said plurality of elastomeric elements to expand to adjust the size of each of said plurality of annular cavities with axial movement of said rod.

9. A device as in claim 8 wherein said plurality of support braces, said plurality of elastomeric elements and said plurality of end plates are arranged such that the size of each of said plurality of annular cavities is reduced when said axial movement of said rod causes said plurality of end plates to expand said plurality of elastomeric elements transverse to said axial movement.

10. A device as in claim 8 wherein each of said plurality of elastomeric elements is fixed to a corresponding one of said plurality of support braces and a corresponding one of said plurality of end plates, and wherein said plurality of support braces, said plurality of elastomeric elements and said plurality of end plates are arranged such that the size of said plurality of annular cavities increases when said axial movement of said rod causes said plurality of end plates to expand said plurality of elastomeric elements parallel to said axial movement.

11. A device as in claim 8 wherein each of said plurality of elastomeric elements is fixed to a corresponding one of said plurality of support braces and a corresponding one of said plurality of end plates, and wherein said plurality of support braces, said plurality of elastomeric elements and said plurality of end plates are arranged such that the size of a portion said plurality of annular cavities is reduced with said axial movement of said rod, and a remainder of said plurality of annular cavities increases with said axial movement of said rod.

12. A device as in claim 11 wherein said tube has a port provided therein and wherein said portion of said plurality of annular cavities are arranged on a first side of said port and said remainder of said plurality of annular cavities are arranged on a second side of said port.

13. A device as in claim 8 wherein each of said plurality of elastomeric elements is cylindrical.

14. A device as in claim 8 wherein the fluid flowing through said tube is water, and wherein said rod, said plurality of support braces and said plurality of said end plates are made materials that are non-corrosive with respect to water.

15. A device as in claim 8 wherein each of said plurality of elastomeric elements is sized to define said plurality of annular cavities of similar size.

16. A device as in claim 8 wherein each of said plurality of elastomeric elements is of a size different from the size of any other one of said plurality of elastomeric elements.

17. A device as in claim 8 wherein there are at least four of said elastomeric elements.

* * * * *